(No Model.) 2 Sheets—Sheet 1.
I. E. PALMER.
SPREADER FOR SPREADING AND STRETCHING FABRICS.
No. 337,987. Patented Mar. 16, 1886.
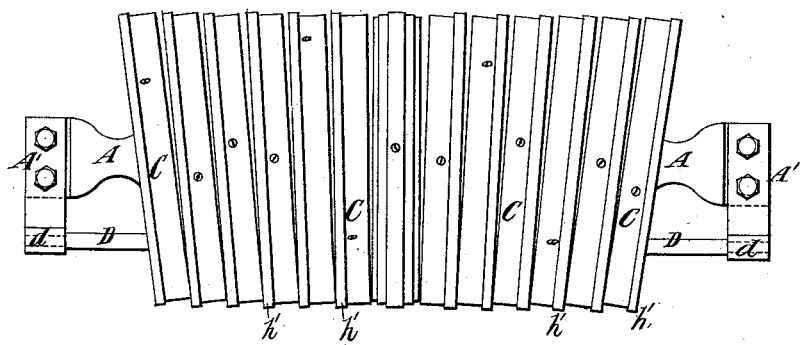
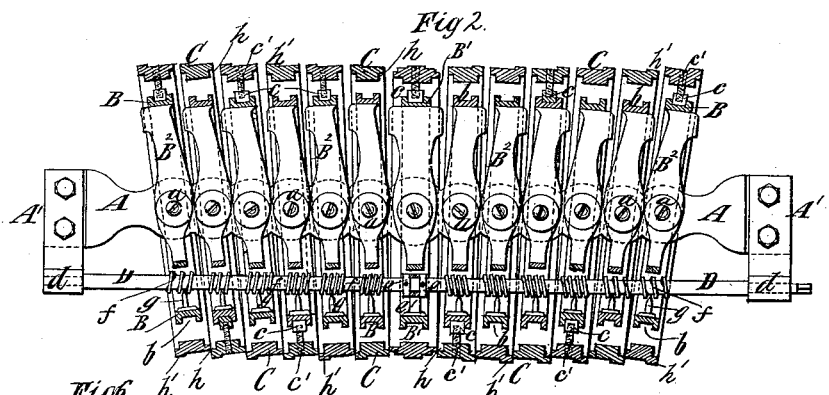
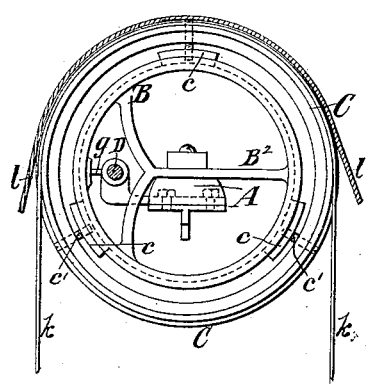
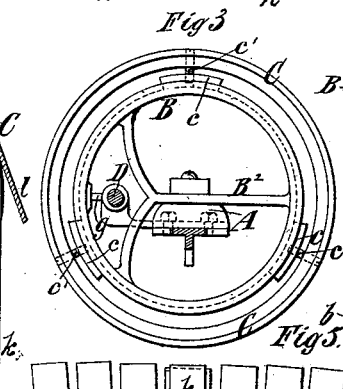
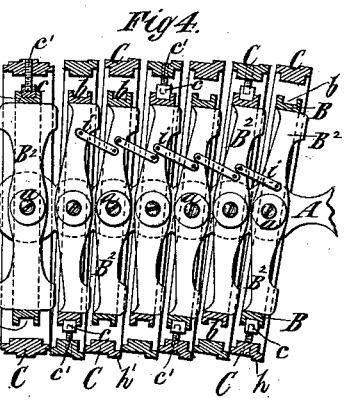
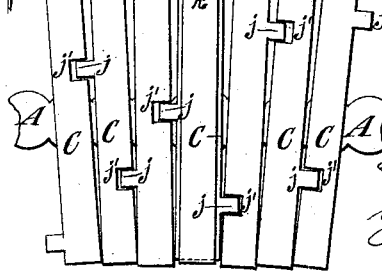
Witnesses —
Inventor —
Isaac E. Palmer (No Model.) 2 Sheets—Sheet 2.
I. E. PALMER.
SPREADER FOR SPREADING AND STRETCHING FABRICS.
No. 337,987. Patented Mar. 16, 1886.
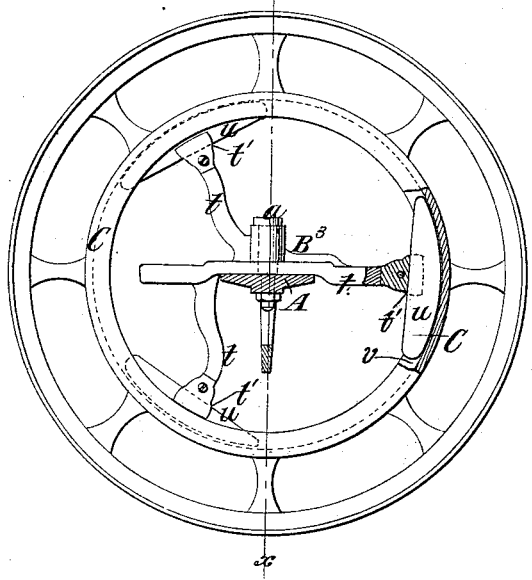
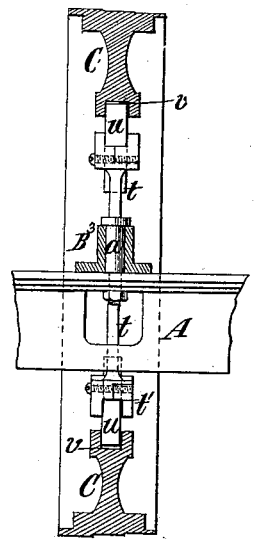
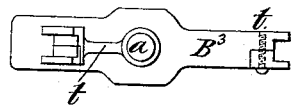
Witnesses
Fred K Hayner
Ed. Moran
Inventor
Isaac E Palmer
by his A Homeyer
Brown & Brown

UNITED STATES PATENT OFFICE.

ISAAC E. PALMER, OF MIDDLETOWN, CONNECTICUT.

SPREADER FOR SPREADING AND STRETCHING FABRICS

SPECIFICATION forming part of Letters Patent No. 337,987, dated March 16, 1886.

Application filed February 4, 1882. Serial No. 51,844. (No model.)

*To all whom it may concern:*

Be it known that I, ISAAC E. PALMER, of Middletown, in the county of Middlesex and State of Connecticut, have invented certain new and useful Improvements in Spreaders for Spreading and Stretching Fabrics, of which the following is a specification.

The invention consists, essentially, in a novel construction of spreader in which the spreading is effected by a series of rings arranged at different angles divergent in opposite directions from a central line or plane adapted to bear upon the fabric throughout its width. These rings are arranged on supporting wheels, frames, or drums, which they encircle, and upon which they may be rotated; and I may provide means whereby the said wheels, frames, or drums, and with them the rings, may be adjusted simultaneously, so that they will diverge more or less from the central line or plane of the spreader, and so tend to spread the fabric to a greater or less degree. One of the rings of the spreader may have a driving-belt placed upon it, and the other rings may be engaged therewith by interlocking lugs and notches or otherwise.

In the accompanying drawings, Figure 1 represents a plan of a spreader embodying my invention, in which the several rings are adapted to rotate independently. Fig. 2 represents a longitudinal section of said spreader. Fig. 3 represents a transverse section of said spreader. Fig. 4 represents a longitudinal section of a spreader of slightly modified form. Fig. 5 represents a plan of a portion of a spreader in which the several rings are connected so as to rotate in unison. Fig. 6 represents a transverse section of the spreader shown in Fig. 5. Fig. 7 represents a transverse section of a spreader of modified form, in which the rings or bands are supported upon a frame. Fig. 8 represents a section upon the dotted line *x x*, Fig. 7; and Fig. 9 represents a plan of the frame shown in Fig. 7.

Similar letters of reference designate corresponding parts in all the figures.

Referring first to Figs. 1, 2, and 3, A designates a flat bar which is rigidly affixed to supports A' at each end, as clearly seen in Fig. 1. B B' designate supporting wheels or drums, of which a number encircle the bar A side by side. These wheels are constructed with cross bars or arms $B^2$, which are pivoted to the bar A by screws *a* or otherwise, so that they are free to swing in a horizontal plane, and may be adjusted at different angles relatively to each other, the wheels B on opposite sides of the wheel B' being always divergent in an opposite direction to the plane of the wheel B', which is in the central plane of the spreader.

C designates rings which are equal in number to the wheels or drums B B' and encircle them, as clearly shown. These rings are held against displacement sidewise in the wheels, but are adapted to rotate freely upon them, and may be connected or engaged with them in any suitable manner to permit of their being so rotated.

In the present example of my invention I have represented the wheels B B' as constructed with grooves *b* in their peripheries, and the rings C are provided with shoes *c*, which are connected with them by pivots or screws *c'*, and which fit and slide in said grooves. If desired, the rings C might have inwardly-projecting flanges, to which are secured blocks or lugs fitting in the grooves *b*.

Various mechanism may be employed for adjusting the several wheels B' and with them the rings C at different angles divergent in opposite directions from a central line or plane. In this example of my invention I have represented a rod or shaft, D, which is supported in bearings *d* and may be turned by means of a wrench or handle applied to its end. Upon the shaft D, opposite the center wheel, B', of the spreader are collars *e*, which receive between them an arm, *e'*, projecting inward from the rim of the wheel, and thereby the center or middle wheel, B', is held against movement sidewise. Upon the shaft D, opposite the several wheels B, are screw-threads *f*, those on the right-hand side of the center wheel, B', being right-hand threads and those on the left-hand side thereof being left-hand threads. The screw-threads on the shaft D opposite the wheels next to the center wheels are of the shortest pitch, and the threads gradually increase in pitch in each direction, those opposite the two outside wheels being of the longest pitch or the quickest threads.

Upon each of the wheels B is a pin, *g*, projecting inward from its rim and engaging with the screw-thread *f* opposite said wheel, and it will therefore be understood that by turning the shaft D in one direction the wheels on one side of the center will be adjusted so that they will stand at different angles to the center wheel and at an angle to each other, and the wheels and rings on the other side of the center wheel will be adjusted in a similar manner, but in the opposite direction. By turning the shaft D in the opposite direction the several wheels and rings will all be adjusted inward toward the center wheel and ring, and it will be understood that by turning the shaft more or less the degree of divergence of the wheels and rings may be varied, and hence the cloth passing over the spreader will be subjected to a greater or less stretching action.

It will be seen that during all the time that the rings are being adjusted, or throughout their whole range of adjustment, said rings are adjusted simultaneously, and hence they have a very gradual spreading action on the fabric, and an action which is uniform throughout the width of the fabric.

If desired, the several rings C may have their rims recessed or counterbored on the inside, as seen at $h$, so as to receive the edge of the adjacent rings upon the outside, as seen in Fig. 2, and in order to give the rings a firm hold upon the cloth they are shown as constructed with external flanges or ribs, $h'$, or they may be studded or provided on the periphery with pins, or they may be covered with card-clothing, or roughened in any suitable manner.

Fig. 4 represents the several wheels B on one side of the center wheel, B', as connected by links, and the wheels on the other side of the wheel B' will be connected in a similar manner, they being here omitted because of lack of room. A designates the bar to which the wheels B B' are pivoted by means of screws $a$ or pins inserted through the arms or cross-bars B² in the manner shown in Figs. 1, 2, and 3. The shaft D with its screw-threads is here omitted and the several wheels B are connected with each other by links $i$, pivoted to the arms B² and set obliquely, as clearly shown.

It will be observed that the several links $i$ are not set at uniform distances from the pivots $a$ on which the wheels may be adjusted, the link which connects the wheel next to the center wheel, B', and its adjacent wheel being set farthest from the pivots $a$, and the several other links being set at gradually-approaching distances from the pivots in a direction away from the center wheel, B'; hence, whenever the outward wheel, B, is moved or adjusted sidewise, its link-connection with the wheel next to it will cause the latter wheel to move in the same direction but a less distance, and all the wheels B will be similarly adjusted but at gradually-increasing angles to the center wheel, B'.

In Figs. 5 and 6 the several rings C are constructed with interlocking legs and notches $j\ j'$ in their edges, and of which one or several may be provided on each wheel. By this means the several rings are all connected so as to rotate in unison, and if the center ring be rotated positively by a belt, $k$, all the rings on each side thereof will rotate therewith. The ring C on the center wheel over which the belt $k$ passes, may have a diameter smaller than the rings on each side of it, so that the exterior face of the belt may run even with the periphery of the latter rings.

It will be observed that the several lugs and notches $j\ j'$ are all so constructed that they fit loosely together and do not at all interfere with the adjustment of the rings sidewise at different angles. If desired, the several rings C might be connected by links or otherwise to cause them to rotate in unison.

A continuous or nearly continuous cylindrical surface may be produced outside of the rings C C by winding spirally around them a number of india-rubber bands, and securing the several bands to the several rings at one point on each ring, care being taken not to secure same band on the same side of the centers of two adjacent rings.

In Figs. 7, 8, and 9, I have represented a form of spreader in which the wheels B B' are dispensed with. A designates a bar, substantially like that before described, and B³ designates frames which are secured upon said bar by pivots or screws $a$, upon which they may be swung or adjusted laterally relatively to each other, so as to stand at different angles to each other. The frame B³ is composed of three arms, $t$, which are bifurcated at their ends, and are provided with clamping-screws, whereby segmental shoes $u$ are secured in place. The ring B is of skeleton form, and in its inner periphery is an annular groove, $v$, in which the shoes $u$ fit. The ring C is adapted to rotate freely upon these shoes, and as the said shoes are supported upon inclined seats $t'$ upon the arms $t$ they may be adjusted outward to take up wear by loosening the clamping-screws which hold them in place and adjusting them upon their inclined seats. The rings C C may be furnished with lugs, which may be connected with two adjacent rings in such a manner as to extend diagonally across the spaces between the rings and so cover said spaces and give the spreader a nearly continuous surface. The shoes $c$ and $u$ instead of being composed of slides, as here shown, may be made in the form of anti-friction rollers.

By my invention I provide a spreader which may be readily adjusted to more or less spread and stretch the cloth, and which, as it works with a roller action, operates very effectively on the cloth.

What I claim as my invention, and desire to secure by Letters Patent, is—

1. The combination, in a spreader, of a series of supporting wheels or frames arranged side by side and capable of being adjusted at different angles divergent in opposite directions from a central line or plane, means for so adjusting said wheels or frames simultaneously throughout their whole range of adjustment, and a series of rings encircling said wheels or frames adapted to be rotated upon and adjusted with said wheels or frames and adapted to bear upon the fabric throughout its width, substantially as specified.

2. The combination, in a spreader, of a stationary supporting-bar, a series of non-rotary supporting wheels or frames attached to said bar, but adjustable thereon at different degrees of divergence in opposite directions from a central line or plane, and a series of rings encircling said bar and wheels or frames, each ring being fitted to rotate on a wheel or frame and forming a cloth-supporting surface which is continuous throughout its periphery, substantially as herein described.

3. The combination, in a spreader, of the bar A, the supporting wheels or frames, the rings C, and the screw-shaft D, having threads of different pitch engaging with said wheels, substantially as specified.

4. The combination, in a spreader, of a supporting-bar, a series of frames pivoted thereto so as to be capable of adjustment laterally relatively to each other, and each comprising arms having shoes at their outer ends, and rings fitted to and adapted to rotate upon said shoes, substantially as specified.

5. The combination of the bar A, the frame $B^3$, comprising arms $t$, having inclined seats $t'$, the shoes $u$, fitting said inclined seats $t'$, and the rings C, fitted to and adapted to rotate upon said shoes, substantially as specified.

6. The combination, in a spreader, of a series of springs arranged side by side and connected together so as to be capable of rotation in unison, with means for adjusting them at different angles to each other, and means for imparting rotary motion to one ring and through it to the others, substantially as specified.

7. The combination, in a spreader, of the bar A, the non-rotary wheels B B', the rings C, constructed with interlocking lugs and notches $f$ $f'$, and the belt $k$, substantially as specified.

ISAAC E. PALMER.

Witnesses:
T. J. KEANE,
FREDK. HAYNES.

Corrections in Letters Patent No. 337,987.

It is hereby certified that in Letters Patent No. 337,987, granted March 16, 1886, upon the application of Isaac E. Palmer, of Middletown, Connecticut, for an improvement in "Spreaders for Spreading and Stretching Fabrics," an error appears in the printed specification requiring correction, as follows: In line 35, page 3, the word "springs" should be stricken out and the word *rings* inserted instead; and that the said Letters Patent should be read with this correction therein that the same may conform to the record of the case in the Patent Office.

Signed, countersigned, and sealed this 23d day of March, A. D. 1886.

[SEAL.]

H. L. MULDROW,
*Acting Secretary of the Interior.*

Countersigned:
M. V. MONTGOMERY,
*Commissioner of Patents.*